United States Patent [19]

Dodgen

[11] 4,044,999
[45] Aug. 30, 1977

[54] CAMPER JACK

[75] Inventor: John N. Dodgen, Humboldt, Iowa

[73] Assignee: Dodgen Industries, Inc., Humboldt, Iowa

[21] Appl. No.: 736,695

[22] Filed: Oct. 29, 1976

[51] Int. Cl.$^2$ .............................................. B66F 7/26
[52] U.S. Cl. ................................................... 254/45
[58] Field of Search ............................. 254/45, 86 R

[56] References Cited

U.S. PATENT DOCUMENTS

| | | | |
|---|---|---|---|
| 3,155,373 | 11/1964 | Rae | 254/45 |
| 3,289,868 | 12/1966 | Miller et al. | 254/45 |
| 3,567,271 | 3/1971 | Gostomski | 254/45 |
| 3,580,599 | 5/1971 | Dodgen | 254/45 |

Primary Examiner—Al Lawrence Smith
Assistant Examiner—Robert C. Watson
Attorney, Agent, or Firm—Zarley, McKee, Thomte, Voorhees & Sease

[57] ABSTRACT

A jack system for a vehicle mounted camper including a first pair of jacks secured to the lower front corners of the camper and a second pair of jacks secured to the rearward end of the camper. The front jacks are adapted to be lowered into ground engagement at times to support the front end of the camper while the rear jacks are adapted to be lowered to the ground to support the rearward end of the camper. The front jacks have their upper ends laterally adjustably secured to the camper so that the front jacks may be closely positioned adjacent the vehicle when in a travel position and so that they may be moved outwardly therefrom to a support position to enable the camper to be loaded on the vehicle or unloaded from the vehicle. The vehicle has a pair of brackets secured to its frame which are adapted to have the lower ends of the first pair of jacks connected thereto to tie down the camper to the vehicle when the jacks are not being used to support the camper. The lower ends of the first pair of jacks are provided with a quick length adjustable apparatus.

3 Claims, 5 Drawing Figures

CAMPER JACK

BACKGROUND OF THE INVENTION

Conventional vehicle mounted campers usually have a front pair of jacks secured to the front portion of the camper and a rear pair of jacks secured to the rear end of the camper to support the camper when it is removed from the vehicle and to level the camper when it is being used on the vehicle. The front pair of jacks are normally secured to the lower front portion of the camper and extend downwardly therefrom closely adjacent the outer side of the vehicle bed. The conventional jacks do not create any unusual problems when the vehicle is of the pick-up truck with only a single rear wheel at each side thereof. However, in recent year, trucks employing a pair of dual rear wheels have been used and the outer wheel of each pair of wheels protrudes outwardly from the side of the vehicle. Thus, the width of the dual wheels interferes with the loading and unloading of the camper since the jacks will be struck by the outer wheels.

Therefore, it is a principal object of this invention to provide a camper jack for a camper which is laterally adjustably secured to the camper.

A still further object of the invention is to provide a camper jack which may be laterally moved outwardly with respect to the camper for loading and unloading operations and which also provides increased stability to the camper when the camper is supported on the ground.

A still further object of the invention is to provide a camper jack having a quick length adjustable adjacent the lower end thereof.

A still further object of the invention is to provide a camper jack which is economical to manufacture, durable in use and refined in appearance.

SUMMARY OF THE INVENTION

This invention relates to a camper jack and more particularly to a camper jack which is laterally adjustably secured to each of the forward sides of the camper to enable the camper jacks to be moved laterally outwardly with respect to the camper when the camper is being loaded or unloaded. The mounting means for the camper jacks comprises a channel-shaped member which is secured to the camper at each side thereof. A horizontally-disposed plate is secured to the upper end of the camper jack and is horizontally slidably received within the channel-shaped support. A quick length adjustable feature is also provided at the lower end of the camper jack.

DESCRIPTION OF THE PREFERRED EMBODIMENT

Figure 1:
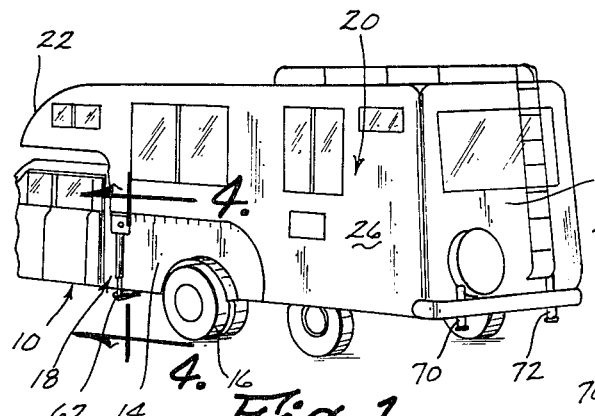
FIG. 1 is a partial rear perspective view of a camper mounted on a vehicle with the apparatus of this invention secured thereto.
Figure 3:
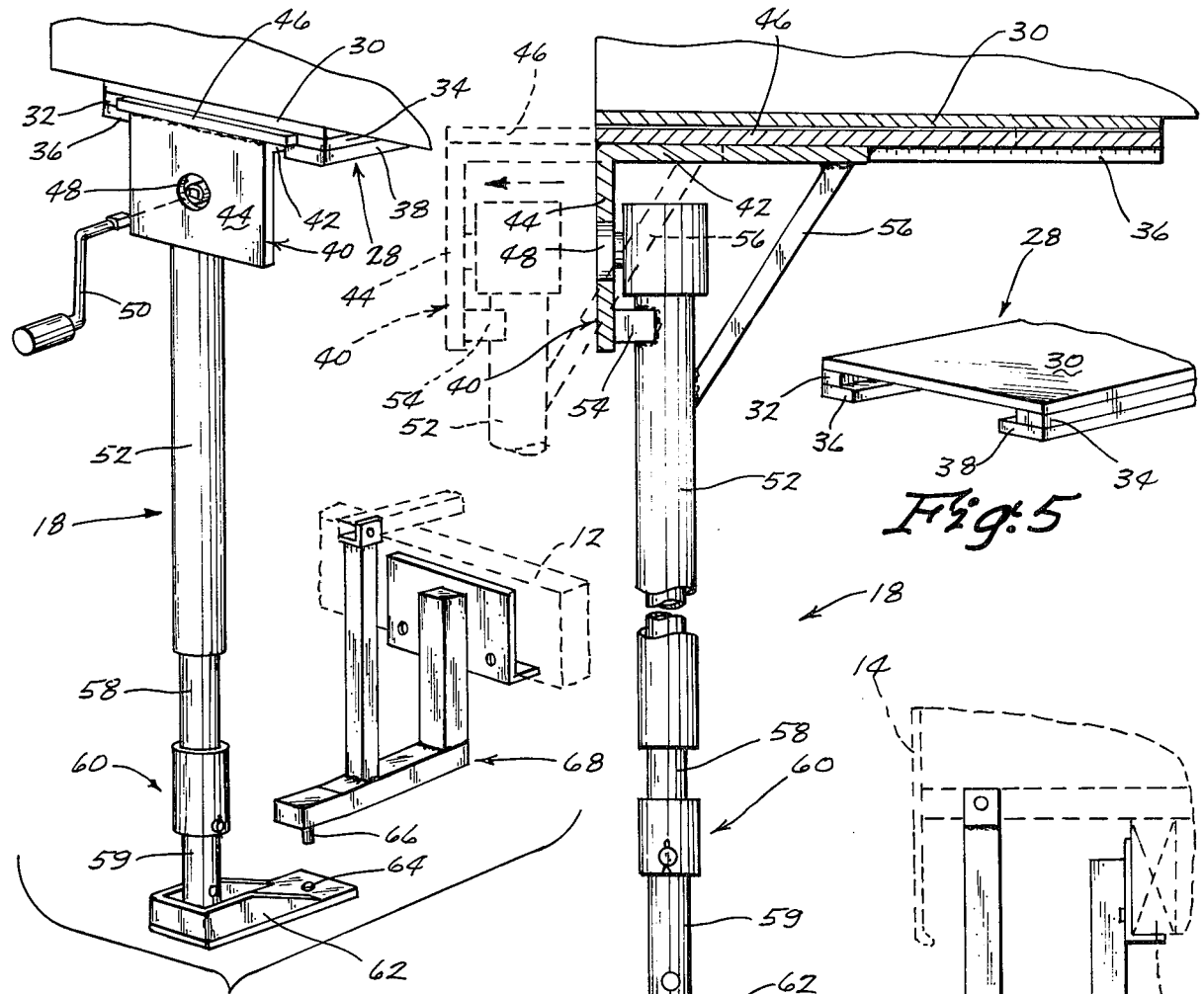
FIG. 3 is a perspective view of the camper jack of this invention.
Figure 4:
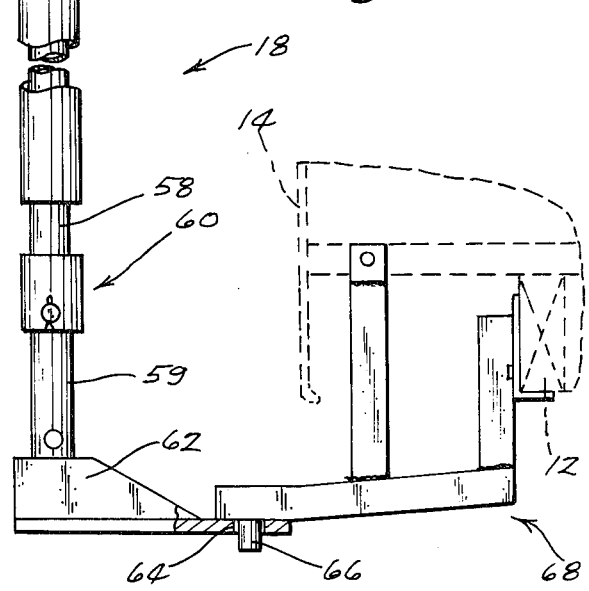
FIG. 4 is an enlarged partial view seen on lines 4—4 of FIG. 1.

The numeral 10 refers generally to a vehicle including a pair of longitudinally extending frame members, one of which is shown in FIGS. 3 and 4 and indicated by the reference numeral 12. The vehicle 10 also includes a bed 14 mounted thereon in conventional fashion. The device of this invention is especially well adapted for use on those vehicles such as illustrated in FIG. 1 including dual wheels 16 at each side thereof. It can be seen in FIG. 1 that the outermost wheel extends laterally from the side of the bed 14.

The camper jack of this invention is referred to generally by the reference numeral 18 and is designed to be secured to the camper 20 at the forward end thereof. For purposes of description, camper 20 will be described as having forward end 22, rearward end 24, and opposite sides 26 and 28.

Figure 2:
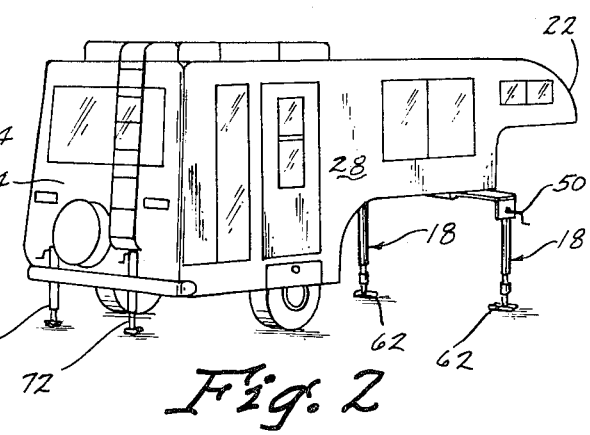
FIG. 2 is a view similar to FIG. 1 except that the camper has been removed from the vehicle.

A pair of jacks are secured to the camper 20 at the lower forward corners thereof as illustrated in FIGS. 1 and 2. Inasmuch as both the jacks are identical, one of the jacks will be referred to by the reference numeral 18 while the other jack will be referred to by the reference numeral 18'.

Figure 5:
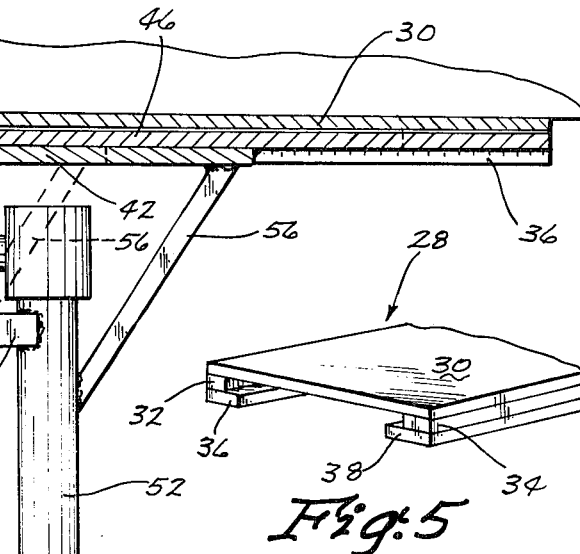
FIG. 5 is a partial perspective view of the channel-shaped support which slidably receives the upper end of the camper jack.

A channel-shaped support 28 is secured to the underside of the lower corners of the camper. As seen in FIG. 5, support 28 comprises a top plate 30, spacers 32 and 34 extending downwardly from the forward and rearward ends of plate 30, and plate portions 36 and 38 extending horizontally inwardly from the undersides of spacers 32 and 34.

Jack 18 is provided with a support member 40 at its upper end comprising horizontal plate portion 42 and vertically extending plate portion 44. A flat plate 46 is secured to the top surface of plate portion 42 by welding or the like and has a width slightly less than the distance between the inner ends of spacers 32 and 34 to enable it to be slidably received therebetween above the plate portions 36 and 38 as seen in the drawings. Vertically extending plate portion 44 is provided with an opening 48 formed therein to permit the crank handle 50 to be extended therethrough for engagement with the screw mechanism of the jack.

Jack body 52 is secured at its upper end to the rearward side of the vertically extending plate portion 44 by braces 54. At least one brace 56 is secured to and extends between the body 52 and plate 42 as illustrated in FIG. 4.

Jack 18 includes a tube 58 extending downwardly from body 52 which has a tube 59 connected to the lower end thereof by a fast-drop apparatus referred to generally by the reference numeral 60 to enable tube 59 to be quickly raised and lowered with respect to tube 58. Shoe 62 is secured to the lower end of tube 59 and extends inwardly therefrom. As seen in the drawings, shoe 62 is provided with an opening 64 formed therein which is adapted to receive pin 66 of a tie down bracket 68 secured to frame 12 as illustrated in FIGS. 3 and 4. A tie-down bracket identical to bracket 68 would also be secured to the frame member at opposite side of the vehicle and would be used in conjunction with jack 18'. In normal travel position, the jacks 18 and 18' are closely positioned ajacent the sides of the bed 14. The travel position of the jack 18 is illustrated in FIGS. 3 and 4 and it can be seen that plate 44 is positioned approximately in the same plane as the side of the camper. In the travel position, opening 64 of shoe 62 receives the pin 66 to tie down the forward end of the camper to the bed 14. When it is desired to remove the camper 20 from the bed 14, the rear jacks 70 and 72, mounted on the camper 20, are lowered into ground engaging position. The crank 50 is employed to lower tube 58 with respect to body 52 so that shoe 62 is disengaged from the bracket 68. Jack 18 is then slidably moved laterally with respect to the channel-shaped support 28 from the solid position illustrated in FIG. 4 to the broken line position illustrated in FIG. 4. Shoe 62 is then lowered into ground engagement by either the fast-drop apparatus 60 or by the crank 50 or both. Jack 18' is then similarly moved laterally with respect to the camper 20 as seen in FIG. 2. The vehicle may then be driven forwardly with respect to the camper and it can be seen that the movement of the jacks 18 and 18' outwardly from the camper permits the dual wheels of the vehicle to pass therebetween. The increased distance between the jacks 18 and 18', from that on the vehicle, also provides somewhat more stability to the camper when the camper is being supported on the ground as illustrated in FIG. 2.

Thus it can be seen that a novel camper jack has been provided which may be selectively laterally adjusted to enable the camper to be easily loaded and unloaded without fear that the dual wheels will damage the same. Thus it can be seen that the canoer jack accomplishes all of its stated objectives.

I claim:
1. In combination,
   a truck including a frame means having rearward and forward ends, a bed means operatively secured to said frame means and having opposite sides,
   a camper means mounted on said bed means and including rearward and forward ends and opposite sides,
   a first jack means having upper and lower ends and being length adjustable from first to second positions, the upper end of said first jack means being selectively movably secured to said camper means at one side thereof adjacent the forward end thereof, said first jack means being laterally adjustable from a travel position closely adjacent said one side to a support position outwardly therefrom,
   a second jack means having upper and lower ends and being length adjustable from first to second positions, the upper end of said second jack means being selectively movably secured to said camper means at the other side thereof adjacent the forward end thereof, said second jack means being laterally adjustable from a travel position closely adjacent said other side to a support position outwardly therefrom,
   and means on said frame adapted for connection to the lower ends of first and second jack means to detachably hold said first and second jack means in said travel positions,
   said first and second jack means normally having their upper ends positioned below the lower forward end of said camper means, when in said travel position, and normally dwelling in a vertical plane inwardly of the sides of said camper means when in said travel position.

2. The combination of claim 1 wherein a channel-shaped support means is mounted at each side of said camper means, the upper ends of said first and second jack means having a horizontally disposed plate means at the upper ends thereof which are slidably received by said channel-shaped support means.

3. The device of claim 1 wherein a first bracket means is secured to said frame means,
   means on the lower end of said first jack means adapted to engage said first bracket means when said first jack means is in its first position to prevent the forward end of said camper means from moving with respect to said bed means,
   a second bracket means secured to said frame means,
   means on the lower end of said second jack means adapted to engage said second bracket means when said second jack means is in its first position to prevent the forward end of said camper means from moving with respect to said bed means,
   the lower ends of said first and second jack means adapted to engage the ground to support said camper means when said first and second jack means are moved to their said support positions and moved to their said second positions.

* * * * *